April 16, 1935.  A. N. GEYER  1,998,005
SPEED CONTROLS
Filed March 24, 1932
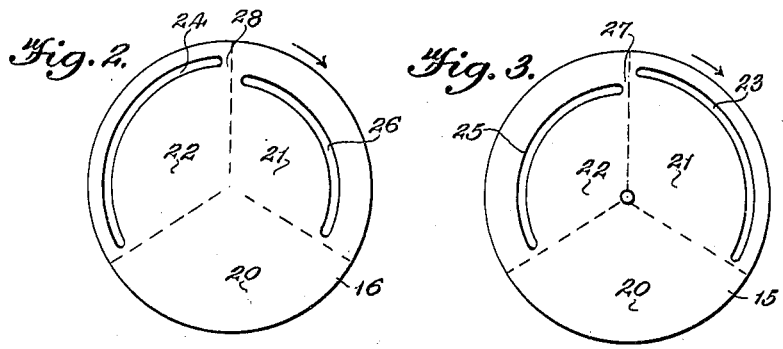
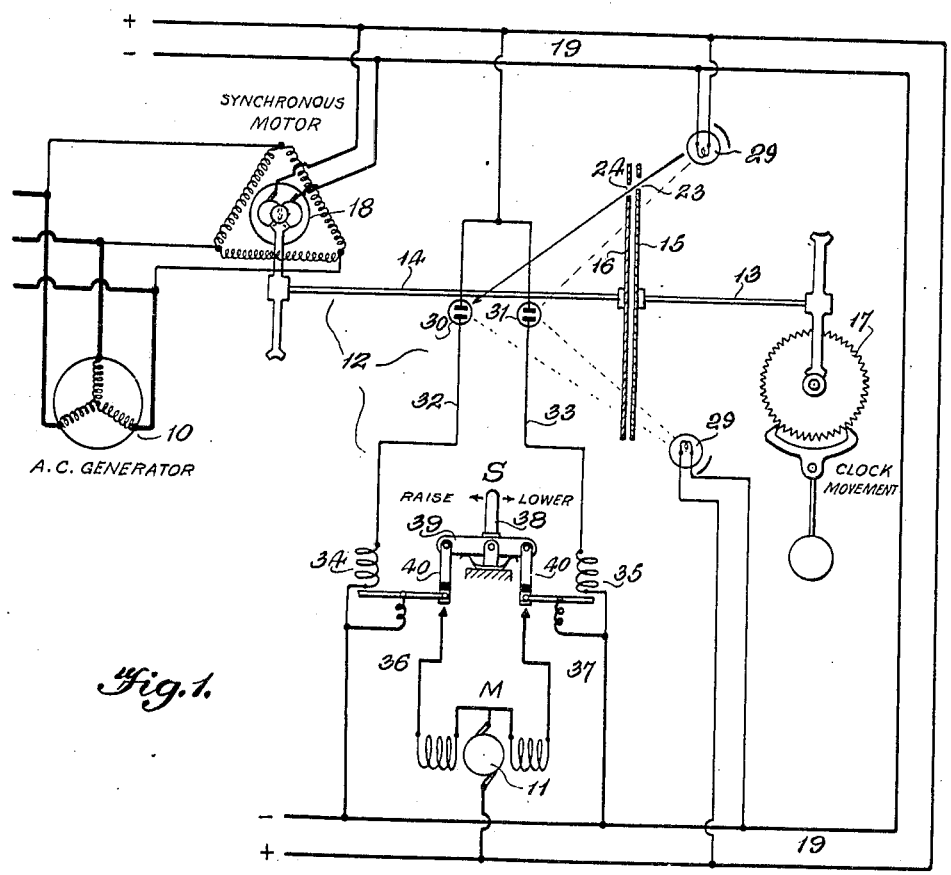
Inventor
Arthur N. Geyer.
By H.S. Woodward,
Attorney Patented Apr. 16, 1935

1,998,005

UNITED STATES PATENT OFFICE 1,998,005

SPEED CONTROL

Arthur N. Geyer, Seattle, Wash.

Application March 24, 1932, Serial No. 601,161

9 Claims. (Cl. 175—355)

The invention relates to means for automatically regulating the speed of prime movers, motors and various machines, and has for an object to enable such regulation accurately within extremely narrow limits.

An important purpose is to present such a device which will be operative sustainedly upon and in response to average speed variation from a rate fixed by a master mechanism.

It is also an aim so to embody the invention that it will not require intermittent fixed-time impulses to be maintained through a system, but will transmit a control impulse of the necessary character in response to need therefor. In the control of alternating current generating units in electric power systems, the invention is particularly useful, and in this use it is valuable in overcoming the effect or need of a droop-curve relation between speed and load, in the operation of governors and gates as usually practiced (by "gates" is intended to be included hydro-unit wicket gates and needle valves; valves for controlling steam supply to steam-driven units; and also in the case of electric motors may include as an equivalent any device for controlling the power applied).

Among other important aims and attainments of the invention are: To present an extremely simple and inexpensive control or regulator unit, which may readily be produced in a standard form and installed in various power systems or plants; to enable the embodiment of such a device that readily may be utilized by the ordinary station attendants so that it may be installed without need for specialized technicians or high training in electrical science; to embody an operative system which will be liable in a minimum degree to derangement through wear, or by minor transmission disturbances, and will be free of delicate adjustment features or parts; to construct a regulator unit in which failure of any of the parts to function readily will be understood by ordinary electricians and may be remedied with facility by simple replacements.

It is a purpose to evolve a device which will be operative normally to prevent variation of more than a very small fraction of the chronological intervals employed, and to tend to bring a controlled unit back into exact average speed with the master device or its basic interval.

The invention is of importance in view of the general adoption of clocks operated by alternating current, and timing devices so controlled, it being the aim of public service companies so to maintain the average frequency of the current supplied that the public may with confidence adopt such clocks with the assurance that resetting seldom will be required.

Additional objects, advantages and features of invention reside in the construction, arrangement and combination of parts involved in the embodiment of the invention and its application to use, as will be understood from the following description and accompanying drawing, in which Figure 1 is a diagrammatic representation of the control system and mechanism in one embodiment.

Figure 2 is a detail of the control disc.

Figure 3 is a similar view of the master disc.

There is illustrated a system which in Figure 1 involves an alternating current generator or dynamo 10, which may be a part of a hydro-electric unit, or a steam unit, or driven by any source of power having familiar means for its modulation, as gates, valves, or switches, these details not being illustrated, since they involve well known forms suitable for such control. The control of flow of water or steam to this prime mover may include a reversible motor 11 which may be connected in the familiar ways with the valves or gates necessary, or to the speed-setting member of a governor. Other approved controls of the generator also may be used. In the case of a motor to be regulated, the motor 11 may be connected to a brush shifting means or other approved practice followed.

At a convenient point on the system, which may be in a dispatcher's office or laboratory provided with circuits or carrier system to the generating plant, or in the plant if desired, the control unit is installed. This consists of separately operated shafts 13 and 14 revolubly mounted, and in this instance, coaxial, one carrying a master disc 15 fixed on the shaft 13 in a plane at right angles to the shaft, while a controlled system disc 16 is similarly fixed on the shaft 14 in very close spaced relation to the first disc. The shaft 13 is driven at a predetermined speed by means of a master clock mechanism 17 of any approved form, while the shaft 14 is driven by a synchronous motor 18 energized by the generator 10. The clock mechanism is constructed to drive the disc 15 clockwise at a suitable speed, while the disc 16 is so geared to the motor 18 as to rotate in the same direction as the disc 15 and at the same speed when the frequency of the generator is correct. The speed of rotation of these discs need not be rapid, and especially need not be at the same rate as that of the generator. In fact, it is believed preferable that they move quite slowly.

I have contemplated in the present embodiment of the invention a rate of one revolution in two minutes, although this may be varied either way, and there will be further explained a method in which highly satisfactory regulation may be obtained with a speed of one revolution in five minutes.

The discs are considered as each including three equal sectors 20, 21 and 22, respectively each of 120 degrees arc. The lower sector 20 of each disc is imperforate. As shown in Figures 2 and 3, the discs represented are as they would appear if translated in their planes from their alined positions, and viewed from the right of Figure 1. The upper right hand sector 21 of disc 15 is formed with a concentric retard slot 23 near the periphery of the disc, its upper end stopping short of the upper vertical radius of the disc. The upper left sector 22 of disc 16 has a corresponding retard slot 24, which is intended to lap the slot 23 at times, as will be explained, by relative rotation of the discs, but for the functions required in this specific embodiment, the last mentioned slot is formed on a somewhat shorter radius than the cooperating slot 23 of the other disc—that is, it lies slightly nearer the center of the disc (see Fig. 1). In the upper left sector 22 of the disc 15, a concentric advance slot 25 is formed on a much shorter radius than the retard slot in the same disc, and having its upper end stopping short of the vertical upper radius of the disc a distance, so that between the proximal ends of the slots 23 and 25 there is a small opaque sector 27. Likewise, in the disc 16 at the upper right sector, a corresponding advance slot 26 is formed of slightly shorter radius than slot 25, intended to lap the slot 25 at times, but being slightly inward thereof toward the center of the disc. The upper ends of the slots in the disc 16 also stop short of the upper vertical radius of the disc, so as to form a small opaque sector 28. The lower ends of all the slots may stop at or adjacent the lower radii of the respective sectors, or may be shorter, as desired.

To the right of the two discs as shown in Figure 1, and at a distance from the shaft 13 greater than the radius of the slot 23, there are two light sources 29, in the form of electric lamps supplied from a suitable source, diametrically opposite each other with respect to the shaft 13 and both at the same or nearly the same distance from the shafts and from the discs. The slots 23 and 24 are so located that, when lapped, beams from the lamps may pass through these slots when the discs rotate past the lamps, and the slots 25 and 26 are similarly arranged so that, when lapped, differently directed beams may pass therethrough from the same lamps. Near points where these two sets of beams respectively intersect the axis of rotation, there are located retard and advance photoelectric cells 30 and 31, incorporated in respective series circuits 32 and 33 with relays 34 and 35, energization of which will alternately close respective operating circuits 36 and 37 to the reversible motor 11, as will be explained.

It will be seen that with the discs shown in Figures 2 and 3 alined while rotating with the shafts 13 and 14, if the discs move at exactly the same speed and with the small opaque sectors 27 and 28 in registry, no parts of the slots will be in lap position and no light from the lamps 29 will reach either of the cells 30 or 31. The disc 15 thus being moved at the proper speed, should there be a rise in the average frequency of the generator 10, the disc 16 will advance bringing the small opaque sector 28 to the right over the slot 23 until slot 24 is in lap with slot 23. The movement of the discs will finally bring the lapped parts of the slots across the beam from one of the lamps to the photocell 30, sensitizing the latter and permitting current to pass operating the relay 34, closing the circuit 36 to the motor 11, by which a lowering of the generator speed is effected by any usual control connections familiar in the art.

On the other hand, should the average frequency of the generator fall below the predetermined standard, the disc 16 will retard with relation to the disc 15, and the opaque sector 28 will move over the slot 25 until the slots 25 and 26 are lapped, passing a beam to the cell 31, operating relay 35 and closing circuit 37 to operate the motor 11 in a direction the reverse of that produced in the first described corrective action, and causing increase of speed of the prime mover.

It is my practice in frequency control in power plants to use a motor so geared to the gates, valves, governor or other regulating device associated with the controlled machine, that for a given departure in average frequency, operation of the motor 11, for a corresponding time, will produce the correction required. It is a feature of my invention that the amount of lap of the slots corresponds to the extent of phase error in the controlled apparatus, and may therefore be called an index—that is, it shows the angular difference of the controlled device 16 from correct rotation phase, and it indicates the actual average speed variation of the generator 10 from the desired average speed, and likewise the length of the exposure, is proportional to the divergence between the small opaque sectors 27 and 28 up to the quadrature relation, when slots of 90 degrees arc are employed. Hence the corrective effect increases with the departure from standard speed, and thus is directly proportional to the accumulated error usually tolerated in electric clocks.

My invention may be used as a master control and usual governors may be incorporated upon the prime mover if desired, with their speed-setting members connected to my motor 11, or my invention may be utilized as the sole regulating means by connection of the motor 11 to gates or valves, independent of the ordinary governors.

The corrective impulses in circuits 32 and 33 may be extended to any needed distance by use of suitable relays, amplifiers, oscillators and such usual equipment for long wired or carrier channels, so that my central control may be installed where most satisfactory in a system to make corrections of speed setting to any units as desired on the system.

In the particular relay arrangement shown, the relays are coordinated with a two-way manual switch of a type familiar in controlling the frequency of the generating unit. It includes a hand switch or lever 38, a rigidity attached cross arm 39, spring-pressed and yieldingly held in a neutral position. Tilting of the lever in one direction will close circuit to the motor to increase the speed of the generator, and opposite movement of the lever will close a circuit of opposite polarity to the motor, and produce the contrary effect on the generator. The cross arm has a link 40 at each end carrying an insulated brush to engage a respective contact by which either circuit 36 or 37 is closed, as the case may be, and the relays 34 and 35 include respective armature-operated levers connected to the brushes so that the alternative operations may be performed by the individual relays.

The discs 15 and 16 may be caused to rotate at higher speeds so that intermittent operation of the relays will occur when a lap of the slot occurs. The number of the lights or lamps 29 may be increased and the slots of the discs shortened, or more than one set of slots may be formed in the discs if desired. With five lights equally spaced, and two sets of slots diametrically spaced, the discs rotating once in five minutes, corrections at half-minute intervals would be provided. With five lights and the same arrangement of slots shown in Figures 2 and 3, corrections at one-minute intervals would occur. There would be a possibility of continuous operation of the adjusting motor 11 during movement of the lapped parts of the slots past two or more lights if such operations were required.

It is of course not essential that the discs be exactly on the same centers, and in fact they may be mounted on widely separated centers so that only parts overlap, so long as the slots or other apertures are arranged to lap or intersect on the axis of the light beam to the photoelectric cell, when their rates of rotation differ.

With refinements to the operation of the two discs embodied in this invention, a very small departure in average speed would initiate a correction that would act in the right direction and in amount proportional to the departure up to large values. Such provisions would be valuable for meeting more exacting requirements than now encountered in problems of frequency control.

The master clock mechanism may be electrically controlled in consonance with the Naval Observatory time system or other isochronal regulation.

With the construction indicated when an error occurs in either direction, the degree of lap of the respective sets of slots will be proportional to the accumulated error when the unobstructed parts pass the beam from one of the light sources, and in consequence the relays, motor 11 and the control valves will be sustainedly and continuously operated for a time similarly proportional to the degree of error. This will result in a very prompt correction, and will also make the device responsive in a highly satisfactory degree to abrupt and extreme variations of load on service lines.

It should also be noted that the invention enables the use of conventional machinery for operating the power control immediately responsive to photocell energy, such as a motor geared to a gate valve, instead of requiring more delicate devices responsive to short or momentary impulses, and enables complete elimination of manual control or attention.

I claim:

1. In a speed regulating means for rotating members, a master rotor, means to rotate it at a fixed rate, a second rotor laterally spaced therefrom coaxial therewith, separate means to rotate the second rotor in the same direction with the first rotor including a power control, said rotors each having respective outer apertures greatly elongated circumferentially, normally out of register adapted to lap a predetermined line intersecting the rotors at times by relative rotation of the rotors, and having also inner apertures of corresponding length normally out of register and adapted to lap on a different predetermined line at a different position of the rotors, respective light responsive means on said lines at one side of the rotors, and means to project light in said lines at the opposite side of the rotors, and operative connections between the light responsive means and said power control.

2. In a control of the character described a master rotor, a controlled rotor close beside the first rotor, means to control rotation of the second rotor, a light source adjacent and to one side of said rotors, two spaced apart light-responsive means at the side of said rotors, said rotors each having opaque and clear portions arranged so that when rotating in unison and in phase the opaque portions of one register with the clear portions of the other whereby to form a continuous opaque interruption of the beam from said light source toward the said light responsive element, the clear portions of the rotors being circumferentially elongated slots arranged to lap when the discs are out of phase, and being in two sets radially spaced, one slot of each set being on a respective rotor, the slots on each rotor being at opposite sides of a radius of the rotor, whereby one set of slots will lap by relative rotation of the discs and the other set will lap by opposite relative rotation of the discs, each set of slots being arranged to aline with the light source and a respective light responsive means.

3. The structure of claim 1 in which each set of two apertures named has an aggregate length including an arc of approximately one hundred and eighty degrees.

4. The structure of claim 2 in which the rotors are coaxial and each of said slots has a length of approximately ninety degrees.

5. The structure of claim 1 in which the light responsive means are closely adjacent the axis of the rotors and spaced longitudinally of said axis on respective lines coincident with the light source and said inner and outer apertures respectively.

6. The structure of claim 1 in which the light responsive means consists of two elements closely adjacent the axis of the rotors and spaced longitudinally of said axis sufficiently for lines therefrom to inner and outer apertures respectively to converge to a point beyond the further rotor, and a plurality of light sources arranged in a projected cone concentric with the rotors and of which the outer of the last named lines is an element and being arranged at a line formed by projection of said point concentrically on said cone.

7. In a system of the character described, a master rotor and means to move it at a fixed speed, a service rotor, service-line power means to operate the second rotor, both rotors being mounted on a common axis and having a predetermined constant normal relative position unchanged during their movement but variable by response of the service-rotor to variations in power of its connection, said rotors having a set of openings elongated concentrically to said axis, one opening on each rotor, the openings extending in opposite directions from adjacent a given radial plane and of such length that when the rotors are in said normal operative relation opaque portions of the rotors will cover the slots, whereby upon variations of the service-rotor from phase with the master rotor the slots will lap a distance proportional to the accumulated error, a light-responsive means at one side of the rotors, means to project a light beam from the opposite side of the rotors in a line including the path of the slots and the light-responsive means, and means operatively connected with the light-responsive means continuously operative during energization of the light-responsive means to vary the power of the service-rotor operative means, whereby correction of error will be effected by response sustained for a time proportional to the accumulated error.

8. The structure of claim 7 in which the power control includes means to vary power with continuous progressively increased effect during energization of the light responsive means, wherein the first rotor moves very slowly, and in which the operative means for the second rotor includes a speed reducing gearing, whereby a period of sustained corrective action proportional to the accumulated error is effected.

9. In a control of the character described, a master rotor, means to move it at a fixed speed, a service rotor, service-line power means to operate the service rotor, both said rotors being mounted on a common axis and having a predetermined constant normal relative position unchanged during their movement in phase but variable in phase by response of the service rotor to variations in said power means to operate the service rotor, at least one of said rotors having a set of two openings therein radially spaced and each elongated concentrically to said axis, the openings extending in opposite direction from adjacent a radius of the slotted rotor, a power varying means for the means to operate the service rotor, a light-responsive means at one side of the slotted rotor, means including the other rotor to project toward the slotted rotor respective light beams fixed with respect to the last named rotor and in paths the projection of which include the light-responsive means and intersecting the paths of the slots respectively, and means operatively associated with the light-responsive means and said power varying means continuously operative during energization of the light responsive means to vary the power of the service rotor operating means, the said light beams reaching the plane of the slotted rotor being so positioned and fixed relative to the other rotor that they are incident to opaque portions of the slotted rotor during said predetermined normal relative position of the rotors, and said slots being so elongated that upon variations of the service rotor from phase with the master rotor the duration of incidence of a beam with the light-responsive means will be proportional to the accumulated error, whereby correction of error will be effected by response sustained for a time proportional to the accumulated error.

ARTHUR N. GEYER.